UNITED STATES PATENT OFFICE.

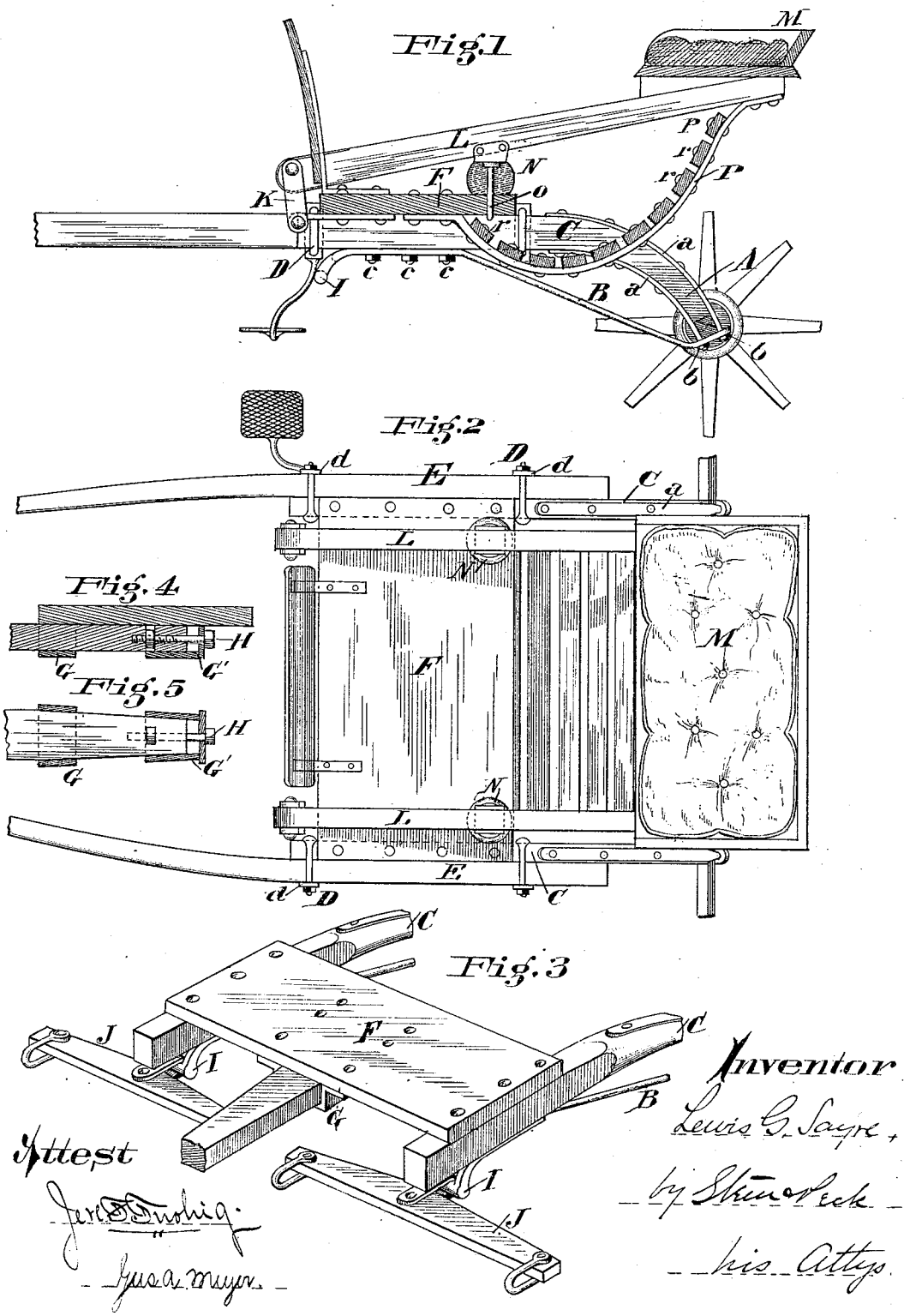

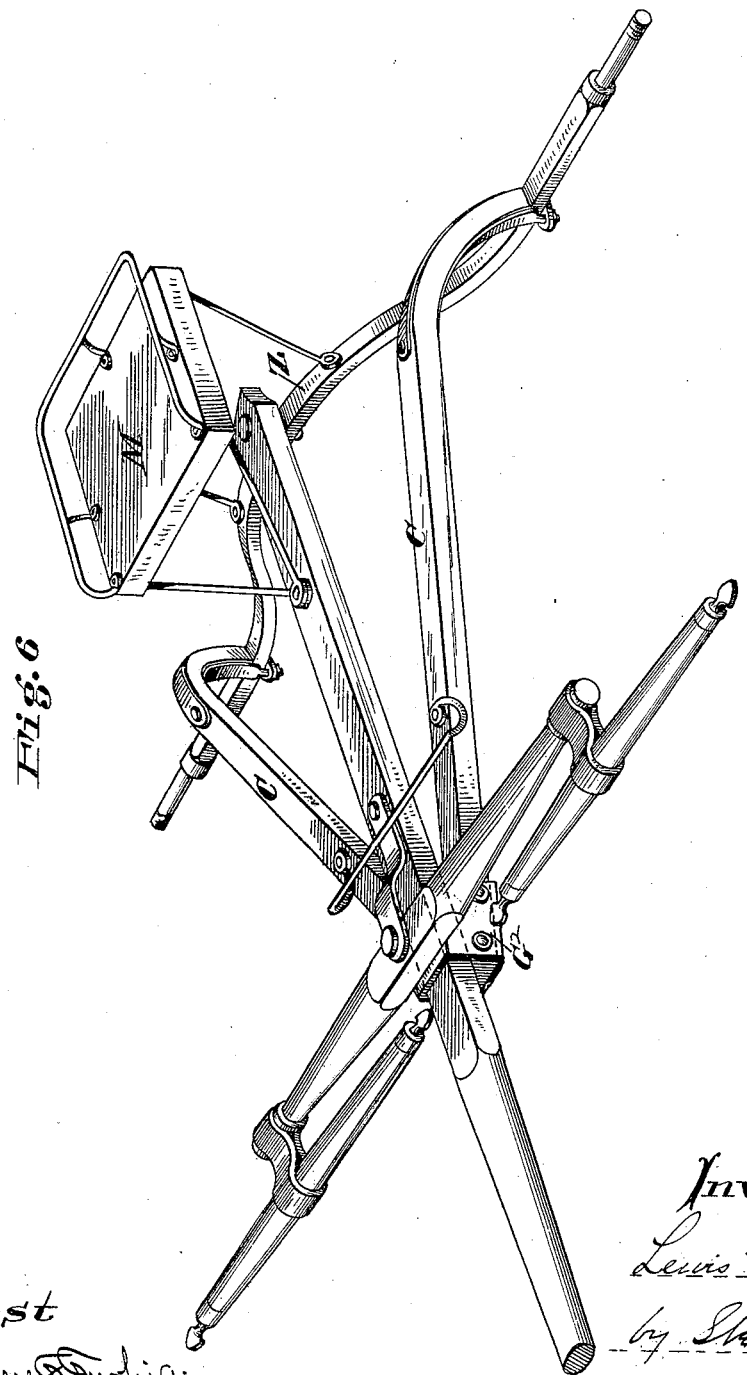

LEWIS G. SAYRE, OF MOUNT HEALTHY, OHIO.

TWO-WHEELED VEHICLE.

SPECIFICATION forming part of Letters Patent No. 266,725, dated October 31, 1882.

Application filed May 1, 1882. (No model.)

*To all whom it may concern:*

Be it known that I, LEWIS G. SAYRE, a citizen of the United States, residing in the town of Mount Healthy, Hamilton county, Ohio, have invented certain new and useful Improvements in Vehicles, of which the following is a specification.

My improvement consists, first, in so constructing the shafts or thills of the vehicle that they can be lengthened or shortened at pleasure—lengthened to make what is called a "kicker" when the horse is hitched far enough from the vehicle to prevent his doing any damage should he kick, or to shorten them for ordinary driving purposes or a pony; second, in so constructing the vehicle that the shafts may be removed and a pole or tongue attached to form a two-horse vehicle with two wheels—a two-horse sulky; third, a novel construction of springs, body, and seat for a vehicle.

In the accompanying drawings, Figure 1 represents a side elevation of my improved vehicle; Fig. 2, a top plan view. Fig. 3 shows the arrangement for attaching the pole and making a two-horse vehicle. Figs. 4 and 5 show the clamps and bolt for fastening the pole in place. Fig. 6 is a modified form for a two-horse sulky.

The axle-brackets C C are attached directly and rigidly to the axle of the vehicle, as shown at A, Fig. 1, by means of the metal braces *a a*, between which they are bolted. The heads of these braces pass through the end of the brace B, and are firmly secured by nuts *b b*, the other end of the brace B being firmly bolted to the under side of the shaft or bracket C at *c c c*, thus forming a firm, rigid connection with the axle. These brackets C C are provided with clamps D D, of any suitable form, which are either stationary or removable, and may be made, as shown in the drawings, in the shape of a staple, with a plate, *d*, fitting over both arms of the staple and screwed up tight by nuts. By means of these clamps, shafts or thills E E are attached to the vehicle, and by loosening the nuts which hold the plates *d d* the thills may be pushed back and shortened or pulled out and lengthened, as is desired; and by simply screwing up the nuts are again made fast and firm. The clamps D may be so arranged that the shafts can be attached to the bracket either on the top or bottom or side, as is most convenient, and different pairs of shafts of various lengths may be inserted. There is bolted to these brackets C C a board or platform, F, and on the center of this platform are provided clamps G and G' for a pole or tongue to be used when it is desired to drive two horses, the thills of course being removed. The pole may be fastened in these clamps in any convenient way; but I prefer the manner shown in Figs. 4 and 5. There the clamps are made slightly tapering toward the rear, so that the farther the pole is inserted the tighter it is held. The rear clamp, G', has a hole in the rear plate, through which passes a bolt, H, with a screw-thread which fits into a corresponding thread in the rear end of the pole, which may be provided with a metal plate or socket, with an internal screw-thread to receive the forward end of the bolt H. As the bolt H is turned and screwed into the end of the pole, the pole is drawn tighter and tighter into the clamps G and G', so as to make a perfectly-rigid joint or connection. On the axle-brackets C C are fastened clevis-loops I I. These may be very conveniently made of the forward end of the brace B, as shown in the drawings. To these are attached by leather or metal straps the single-trees J J when two horses are used, no double-tree being used at all. By this means, when the team makes a turn or curve, the horse on the outer side of the curve pulls the wheel on that side round by a direct draft on it, and of course pulls the pole around, there being no strain on the pole whatever. This direct draft upon either side of the vehicle facilitates making curves, and is of value when horses are driven at a fast speed. When one horse is used with the thills the traces or tugs are attached directly to the clevis loops I I and a single-tree dispensed with.

In front of the platform F, on each side of the vehicle, there is pivoted by a link, K, or in any suitable manner, a spring bar or brace, L, of wood, to the upper ends of which is attached the seat M, and in order to elevate the seat to a proper height and to give it additional spring these bars L L are made to rest on cushions of rubber N, placed at a proper distance from their front ends, which are held in place by the pins o. These rubber cushions or springs may be removed by simply lifting the bars L or seat M high enough to withdraw the pin o. The seat is provided with still another spring by bolting to the bottom of the platform F, or the sides of the brackets C on each side, steel springs P, the rear ends of which are fastened to the bottom of the seat M or the bars L. These springs may be made of any desired strength and shape, and by fastening to them narrow slats of wood R R R a strong and almost solid bottom is made for the vehicle back of the platform F, over which a rug or flexible board may be fastened.

It is sometimes desirable when horses are speeded very fast to make the vehicle as solid as possible and to take away all spring which might affect the motions of the horse or horses in the slightest degree. In that case the rubber springs N are taken out, and, if necessary, the spring P removed and the bars L L strapped tight down on the platform F; or when two horses are to be driven at a high speed the axle-brackets C C are made to converge at a point equally distant from both wheels in front of the axle, as shown in Fig. 6. The forward ends are provided with a clamp, $G^2$, by which they are firmly fastened together and through which the tongue or pole passes, and its rear end bolted or clamped to the axle, as shown at Z, Fig. 6. The double-tree is attached to the ends of the brackets or clamp $G^2$ in the usual manner, and the seat is supported in any convenient way—as by braces—from the axle and pole shown in Fig. 6. By this arrangement no springs are used and the vehicle and horses move absolutely together.

Having thus described my invention, what I claim as new, and desire to secure by Letters Patent, is—

1. In a two-wheeled vehicle, the axle-brackets C C, arranged as described, and provided with the clamps D D for attaching the shafts properly, in combination with the cross-piece F, brackets G G', and bolt H, for attaching a pole.

2. The clevis-loops I I, arranged as described, for attaching either the traces or the single-trees J J, as and for the purpose described.

3. In a two-wheeled vehicle, the springs P P, having their front ends bolted firmly to the cross-beam F and their rear ends bolted firmly to the bars L or the bottom of the seat, as and for the purpose described.

LEWIS G. SAYRE.

Witnesses:
JERE T. TWOHIG,
GUS. A. MEYER.